(12) United States Patent
Campbell

(10) Patent No.: US 6,776,248 B2
(45) Date of Patent: Aug. 17, 2004

(54) FOUR WHEEL DRIVE MOTORIZED CARRIER

(76) Inventor: Jeffery D. Campbell, 2686 N. Argyle St. #101, Fresno, CA (US) 93927

( * ) Notice: Subject to any disclaimer, the term of this patent is extended or adjusted under 35 U.S.C. 154(b) by 163 days.

(21) Appl. No.: 10/045,233

(22) Filed: Oct. 29, 2001

(65) Prior Publication Data

US 2003/0079922 A1 May 1, 2003

(51) Int. Cl.[7] .............................................. B62D 55/02
(52) U.S. Cl. .................................................... 180/9.34
(58) Field of Search ................... 180/185, 648, 180/9.34–9.36, 305–308, 242, 9.42, 6.3, 9.21

(56) References Cited

U.S. PATENT DOCUMENTS

| | | | | |
|---|---|---|---|---|
| 2,467,947 A | * | 4/1949 | Skelton | 180/9.5 |
| 3,666,034 A | * | 5/1972 | Stuller et al. | 180/6.48 |
| 3,682,266 A | * | 8/1972 | Stoliker | 180/9.62 |
| 3,702,642 A | * | 11/1972 | Greene | 180/243 |
| 3,724,583 A | * | 4/1973 | Caldwell | 180/307 |
| 3,783,962 A | * | 1/1974 | Shaffer | 180/243 |
| 3,933,214 A | * | 1/1976 | Guibord et al. | 180/9.1 |
| 4,163,413 A | * | 8/1979 | Kennicutt | 91/521 |
| 4,304,313 A | * | 12/1981 | van der Lely | 180/9.36 |
| 4,328,876 A | * | 5/1982 | Horsch | 180/6.44 |
| 4,348,863 A | * | 9/1982 | Taylor et al. | 60/327 |
| 4,474,357 A | * | 10/1984 | Noffke | 251/233 |
| 5,318,141 A | * | 6/1994 | Hansen | 180/8.2 |
| 5,343,960 A | * | 9/1994 | Gilbert | 172/823 |
| 5,346,172 A | * | 9/1994 | Gonsior | 251/58 |
| 5,575,347 A | * | 11/1996 | Uchibaba et al. | 180/9.1 |
| 5,829,848 A | * | 11/1998 | Kelderman | 305/15 |
| 5,950,748 A | * | 9/1999 | Matsumoto et al. | 180/9.1 |
| 6,076,620 A | * | 6/2000 | Horsch | 180/9.1 |
| 6,199,646 B1 | * | 3/2001 | Tani et al. | 180/9.21 |
| 6,401,854 B2 | * | 6/2002 | Yano et al. | 180/242 |
| 6,409,273 B1 | * | 6/2002 | Campbell | 298/2 |

* cited by examiner

*Primary Examiner*—Lesley D. Morris
*Assistant Examiner*—Paul Royal, Jr.
(74) *Attorney, Agent, or Firm*—Jeffrey A. Hall

(57) ABSTRACT

A four wheel drive carrier having a frame and a carrier body secured to the frame. The carrier body has brake and movement control apparatus secured therein. A pair of wheels and a pair of wheel tracks are secured to the frame for forward and reverse propulsion. A drive engine is operably mounted on the frame and is communicatively linked to the pair of wheels, and to the pair of wheel tracks by a hydraulic drive mechanisms. A throttle mechanism is operably engaged to the drive engine and one or more swing arms are operably secured to the frame.

8 Claims, 2 Drawing Sheets

FOUR WHEEL DRIVE MOTORIZED CARRIER

BACKGROUND OF THE INVENTION

1. Technical Field

This invention relates to transporting and carrying apparatuses such motorized carts, carriers, and tractors, and more particularly to a tracked four wheel drive carrier which is equipped with an engine and drive means for propelling the carrier.

2. Background Art

The usefulness of carrying apparatuses such as tractors, carts, and other carriers are well known to those involved in construction, farming, gardening, and other uses where objects, loads, people, or the like are moved and transported from one place to another.

Heretofore, attempts have been made to power or motorize various tools and carriers such as carts, tractors, golf carts, wheelbarrows, and the like by using gasoline powered engines in order to propel the device. However, none of these devices show a feasible and economical four wheel drive means by which various attachments, such as snowblowers, augers, plows, or the like, may be secured to and powered by the carrier Accordingly, it is the primary object of this invention to provide a four wheel drive carrier which operates safely, efficiently, and which is lightweight, strong, balanced, and efficient at carrying and transporting a wide range of load sizes and weights. The four wheel drive carrier of the present invention includes an accessory attachment valve for attaching various mechanical devices, preferably with hydraulic hoses, to the carrier. The carrier of the present invention has high performance capability and possesses sufficient power to drive the carrier at both slow speeds and high speeds with small, medium or large loads.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims

BRIEF SUMMARY OF THE INVENTION

37 C.F.R. 1.77(a)(8)

To achieve the foregoing objects, and in accordance with the purpose of the invention as embodied and broadly described herein, a four wheel drive carrier having a frame and a carrier body secured to the frame is provided. The carrier body has brake and movement control apparatus secured therein. A pair of wheels and a pair of wheel tracks are secured to the frame for forward and reverse propulsion. A drive engine is operably mounted on the frame and is communicatively linked to the pair of wheels, and to the pair of wheel tracks by a hydraulic drive mechanisms. A throttle mechanism is operably engaged to the drive engine and one or more swing arms are operably secured to the frame. A hydraulic accessory attachment valve is operably secured to the frame.

The four wheel drive carrier of the present invention is lightweight, balanced, efficient, and highly effective at allowing a user to operate a wide variety of devices therefrom simply by attaching the device to the hydraulic attachment lever valve.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE INVENTION

37 C.F.R. 1.77(a)(10)

Reference will now be made in detail to the present preferred embodiments of the invention as illustrated in the accompanying drawings.

In accordance with the present invention, there is provided in a preferred embodiment of the invention, a four wheel drive carrier having a frame and a carrier body secured to the frame. The carrier body has brake and movement control apparatus secured therein. A pair of wheels and a pair of wheel tracks are secured to the frame for forward and reverse propulsion. A drive engine is operably mounted on the frame and is communicatively linked to the pair of wheels, and to the pair of wheel tracks by a hydraulic drive mechanisms. A throttle mechanism is operably engaged to the drive engine and one or more swing arms are operably secured to the frame. A hydraulic accessory attachment valve is operably secured to the frame.

Figure 1:
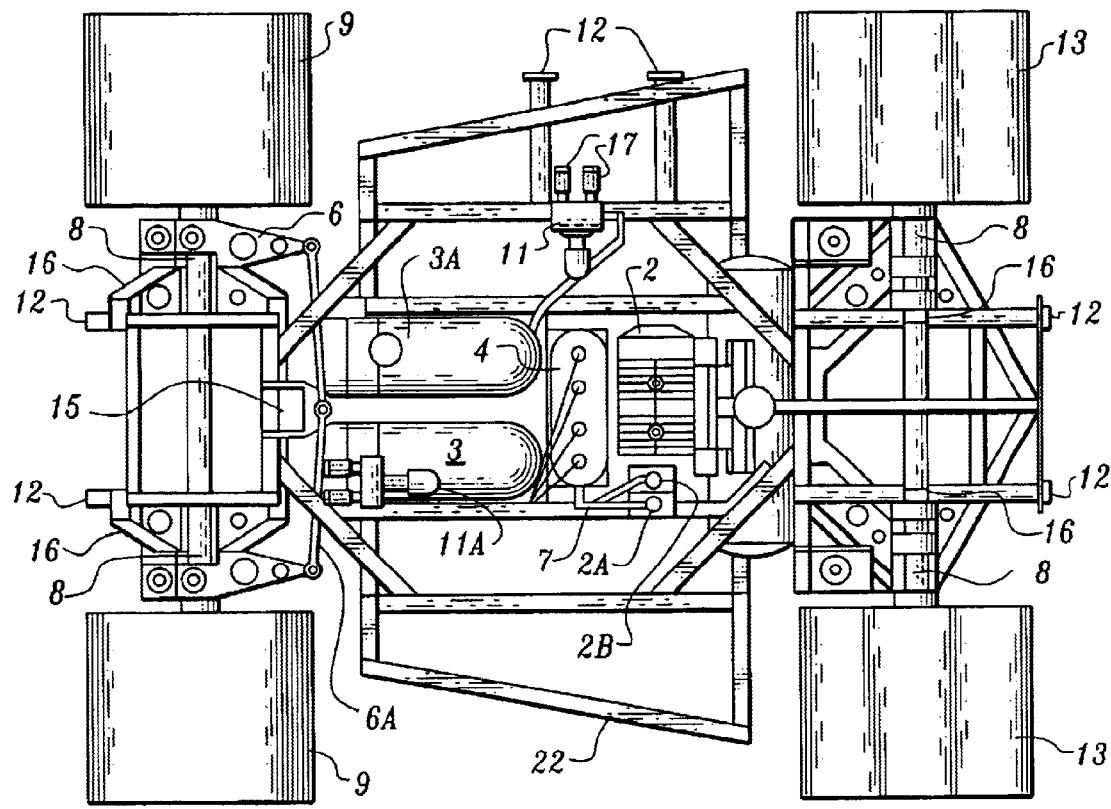
FIG. 1 is a schematic view of a four wheel drive motorized carrier, according to the invention.

In FIG. 1, four wheel drive motorized carrier 10, is shown according to a preferred embodiment of the invention. Preferably, the user turns or otherwise activates ignition switch 1, seen in FIG. 3, which starts engine 2, preferably a gas engine and then pushes accelerator pedal 5, which engages hydraulic fluid pump 2A, through lever drive valve 11A, which then draws hydraulic fluid from hydraulic tank 3A. This forces hydraulic fluid through a four-way flow divider 4, which drives wheels 9, and wheel tracks 13, which are preferably composed of rubber, and provided as a pair. Wheel tracks 13, are used for forward or reverse propulsion of carrier 10.

Figure 3:
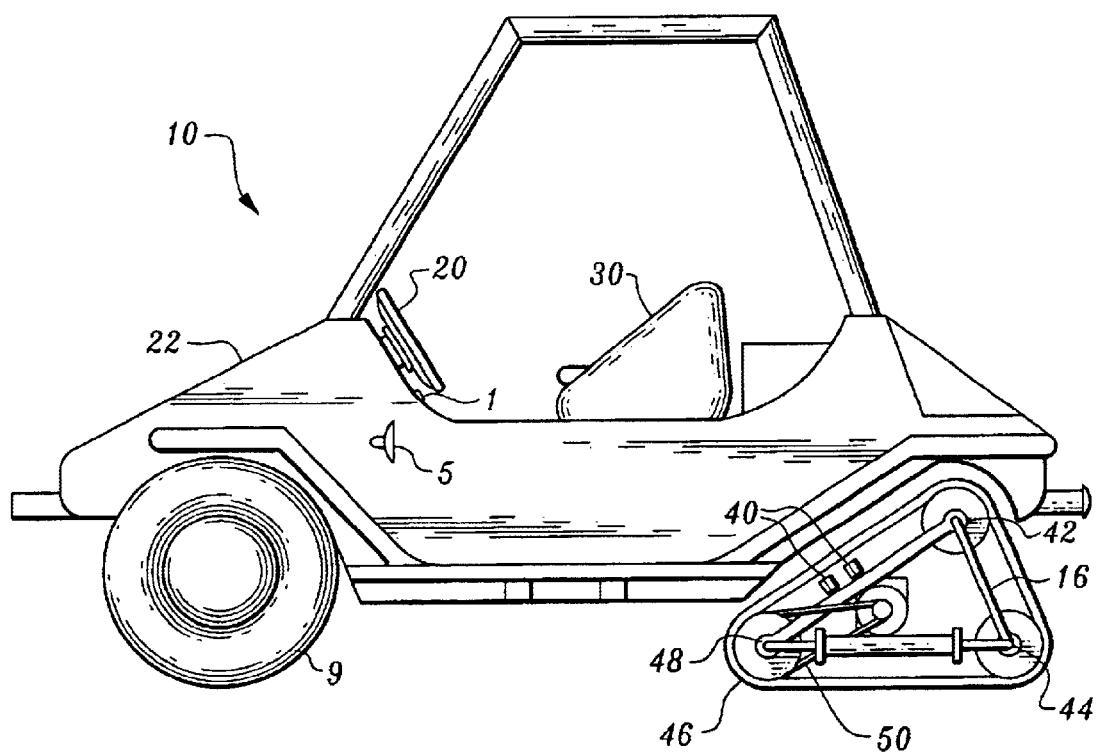
FIG. 3 is a view of a carrier configuration in a preferred embodiment of such four wheel drive motorized carrier, according to the invention.

Four-way flow divider 4, also operably sends fluid through hydraulic cooling tank 3, and then to primary hydraulic tank 3A, to complete the fluid cycle. As seen in FIG. 1, frame 7, is secured to carrier 22, which may be provided in various configurations, one of which is shown in FIG. 3. Preferably frame 7, is composed of steel tubing or other durable resilient material, with attachment brackets 12, for forward, side, and rear, hydraulic attachments, if desired. For example, an accessory attachment valve 11, for attaching various mechanical devices to frame 7, preferably with hydraulic hoses, may be secured to the frame 7, and to a secondary hydraulic pump 2B, and may accommodate operable linkage to various devices such as snowblowers, weed mowers, gardening plows, cultivator devices, scraping devices, augers, hydraulic mixers, carrier tubs, and other attachments. Further, if desired, the four wheel drive motorized carrier of the present invention may be, through a hydraulic valve lever, operably linked to hand-held hydraulic tools such as a hydraulic jack hammer, hydraulic chain saw, hydraulic drill, hydraulic saws and the like. Axles 35 are operably secured to the drive hub, either wheels or track connections, and is best seen in FIG. 1, and may be operably linked to motors 8.

Preferably, accessory attachment valve 11, is secured hydraulic attachments with quick disconnects 17, with attachment brackets. The user can simply attach a chosen attachment and quick disconnect 17, to the hydraulic pressure fittings. Swing arms 16, for frame suspension 15, may alternatively be operably connected to an hydraulic assisted steering pump or gear reduction assisted steering box which operably turns wheels 9, by steering tie rods 6A, and steering arms 6, by the user turning steering wheel 20. Steering wheel 20, is located in operably proximity to seat 30, which is preferably a four-way directional locking seat. In operation and use, a separate brake mechanism is not needed because carrier 10 may be stopped by simply releasing accelerator pedal 5, by fluid braking through hydraulic pump 2A.

Figure 2:
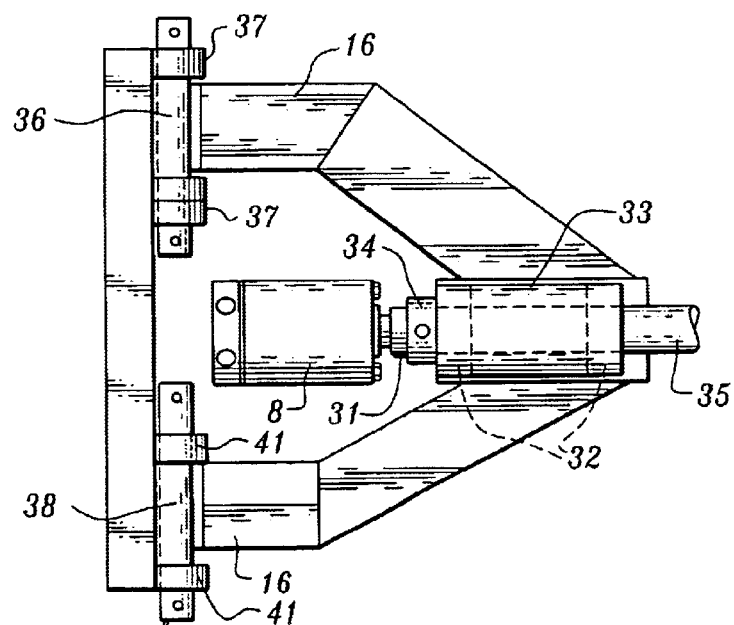
FIG. 2 is a view of a swing arm detachable suspension mechanism of such four wheel drive motorized carrier, according to the invention.

With reference now to FIG. 2, swing arm 16, which are preferable detachable and provided in a pair or otherwise, are operably linked to frame suspension 15, seen in FIG. 1. Swing arm 16 is operably connected to axle 35, with bearings 32, and a splined keyway 31, which may have hydraulic drive motor 8, operably linked thereto with coupler 34 at each wheel or track, or alternatively carrier 10, may be provided without hydraulic drive motors 8. Bearing housing 33, is preferably configured to fit around axle 35, and include bearings 32. Swing arms 16, are preferably linked to sleeve 36 with bearings 37, held within sleeve 36. A second sleeve 38, also preferably includes bearings 41, and is operably secured to pin 39.

In FIG. 3, four wheel drive motorized carrier 10, is shown with swing arms 16, which are preferably detachable, with first tension wheel 42, second tension wheel 44, track 46, which may be composed of steel, rubber, or other durable resilient material, and drive wheel and sprocket 48 which are operably linked to sprocket and chain drive 50. Quick disconnect fittings 40, are preferably provided and allow the user to detach the swing arm or arms if desired, by simply pulling on quick disconnect pins 40, to remove them from the swing arm. The user may also attach or detach various attachments using hydraulic quick disconnects 17, seen in FIG. 1, for the attachment of various hydraulic attachments such as spray attachments, augers, blowers, mowers, skis for snow conditions, harvesters, plows, various carriers, and the like.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

37 C.F.R. 1.77(a)(11)

What is claimed is:

1. A four wheel drive carrier, comprising:

a frame;

a carrier body secured to said frame, said carrier body having lever drive valve means and movement control means secured therein;

a pair of wheels secured to said frame;

wheel track means secured to said frame for forward and reverse propulsion;

a drive engine operably mounted on said frame and communicatively linked to said pair of wheels and to said wheel track means by a hydraulic drive mechanism;

a flow divider operably linked to said frame and to a hydraulic cooling tank and to a primary hydraulic tank, an accelerator means being operably engaged to said drive engine; and swing arm means for frame suspension, said swing arm means being operably secured to said frame.

2. The four wheel drive carrier of claim 1, wherein said drive engine is a gasoline powered engine.

3. The four wheel drive carrier of claim 1, further including a hydraulic accessory attachment valve.

4. The four wheel drive carrier of claim 1, further including a secondary hydraulic pump operably linked to said hydraulic attachment valve.

5. The four wheel drive carrier of claim 1, further including a hydraulic fluid tank.

6. The four wheel drive carrier of claim 1, wherein said lever drive valve is operably linked to said primary hydraulic tank.

7. The four wheel drive carrier of claim 1, a wherein said hydraulic cooling tank is operably secured to said frame.

8. The four wheel drive carrier of claim 1, wherein a hydraulic motor is operably linked to said pair of wheels and said wheel track means of said four wheel drive carrier.

\* \* \* \* \*